UNITED STATES PATENT OFFICE.

R. P. JENKINS, OF NASHVILLE, TENNESSEE.

IMPROVED TONIC BITTERS.

Specification forming part of Letters Patent No. 86,551, dated February 2, 1869.

*To all whom it may concern:*

Be it known that I, R. P. JENKINS, of the city of Nashville, county of Davidson and State of Tennessee, have made a new Medicinal Compound; and I do hereby declare that the following is a correct description of the same.

The compound I manufacture is a superior stomach-bitters, which have a most happy effect when given for many of the diseases that afflict mankind.

For dyspepsia, derangements of the liver and kidneys, and for diseases of a miasmatic nature, my stomach-bitters will prove to be an invaluable remedy.

To make these bitters, I take red cinchona-bark, gentian-root, cinnamon-bark, simple sirup, calamus-root, chamomile-flowers, Robertson county whisky, (Bourbon,) and incorporate them together in certain definite proportions in the manner usual to druggists.

This combination of substances mentioned above I consider a perfect one in the production of a healthy and invigorating tonic.

Having thus described this remedy of mine, what I claim, and desire to secure by Letters Patent, is—

The combination made from the union of the aforementioned ingredients, in the manner and for the purpose described.

R. P. JENKINS.

Witnesses:
WM. G. GLISSAN,
E. L. LAURENT.